(12) United States Patent
Kim et al.

(10) Patent No.: US 6,768,620 B2
(45) Date of Patent: Jul. 27, 2004

(54) ADAPTIVE RECLOSING METHOD USING VARIABLE DEAD TIME CONTROL ALGORITHM IN POWER TRANSMISSION LINE

(75) Inventors: Chul-Hwan Kim, Gyeonggi-do (KR); Sang-Pil Ahn, Seoul (KR)

(73) Assignee: Sungkyunkwan University, Seoul (KR)

(*) Notice: Subject to any disclaimer, the term of this patent is extended or adjusted under 35 U.S.C. 154(b) by 34 days.

(21) Appl. No.: 10/196,680

(22) Filed: Jul. 18, 2002

(65) Prior Publication Data
US 2004/0027747 A1 Feb. 12, 2004

(51) Int. Cl.[7] .............................. H02H 3/00; H02H 3/06
(52) U.S. Cl. ............................................ 361/59; 361/71
(58) Field of Search ................... 361/59, 71, 73, 361/75

(56) References Cited

U.S. PATENT DOCUMENTS

| | | | | |
|---|---|---|---|---|
| 4,493,047 A | * | 1/1985 | Werst .......................... 364/724 |
| 4,674,062 A | * | 6/1987 | Premerlani ................... 364/602 |
| 5,060,166 A | * | 10/1991 | Engel et al. .................. 364/487 |
| 5,805,400 A | * | 9/1998 | Kim ............................. 361/71 |
| 5,809,045 A | * | 9/1998 | Adamiak et al. ............. 371/48 |
| 6,259,996 B1 | * | 7/2001 | Haun et al. ................... 702/58 |

OTHER PUBLICATIONS

Higgins, Digital Signal Processing, 1990, Prentice Hall, pp. 35–41, 225–226, 23–26.*

* cited by examiner

*Primary Examiner*—Gregory J. Toatley, Jr.
*Assistant Examiner*—Z Kitov
(74) *Attorney, Agent, or Firm*—Foley & Lardner LLP (57) ABSTRACT

Disclosed in an adaptive reclosing method using a variable dead time control algorithm in a power transmission line. The method is used to remove faults induced by a circuit breaker being operated by a protective relay and to reclose the circuit breaker after a dead time following faults occurring, thereby automatically and promptly re-establishing power transmission in the network and reliably maintaining the power supply by the transmission system.

3 Claims, 8 Drawing Sheets

ADAPTIVE RECLOSING METHOD USING VARIABLE DEAD TIME CONTROL ALGORITHM IN POWER TRANSMISSION LINE

BACKGROUND OF THE INVENTION

1. Field of the Invention

The present invention relates to an adaptive reclosing method, in particular, an adaptive reclosing method using a variable dead time control in a power transmission line, which is used to remove faults by means of a circuit breaker being operated by a protective relay and to reclose the circuit breaker after the dead time when the faults are occurred in the power transmission line, thereby automatically recovering the prompt power transmission line network and maintaining the reliability of supply of the power transmission system.

2. Description of the Related Art

Figure 3:
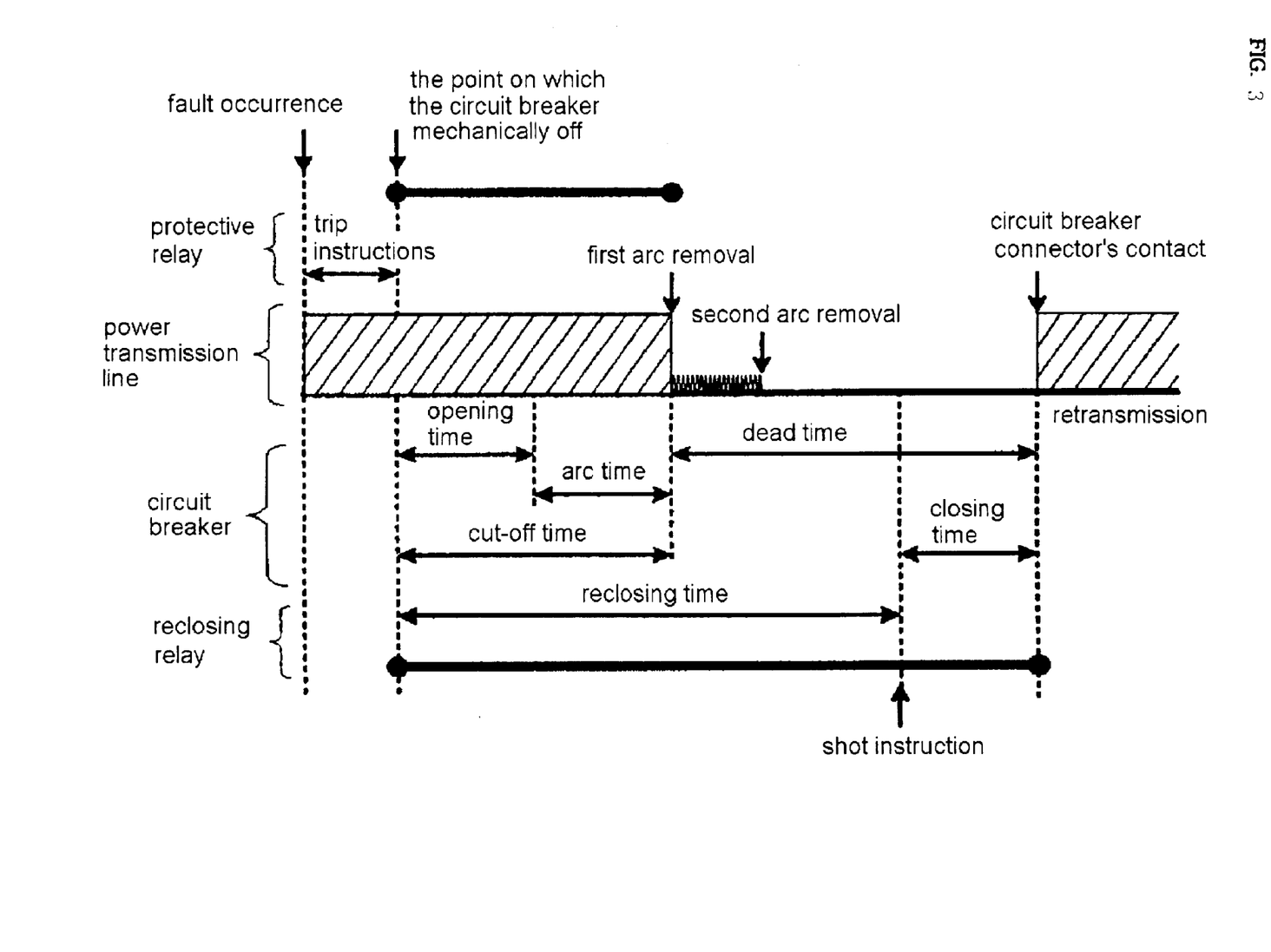
FIG. 3 illustrates a general reclosing operation (dead time, a second arc).

Briefly described are theories relating to a reclosing operation, a dead time, and a second arc for re-transmitting the electric power to recover the power transmission line network and to remove faults by operating the circuit breaker when the faults are occurred in the power transmission line, in reference to FIG. 3.

Most of faults occurred in the power transmission line are the arc faults by a flash of lightning, and the permanent faults are less than 10% of the whole faults. The protective system of the power transmission line controls to re-transmit electric power in a short time by installing an automatic reclosing relay and a fault-detecting relay and cut off on occurring the fault, and applying a circuit breaker again if the arc is de-ionized, thereby providing the effects of maintaining the safety and stability of the system and the reliability of supply and increasing the installation utility rate.

FIG. 3 is a flow chart illustrating, by time, the operation of the protective relay, the circuit breaker and the reclosing relay which are related to the reclosing operation in the terminal of the power transmission line. The circuit breaker is started by the operation of the protective relay, and the reclosing relay reclose the circuit breaker by instruction as waiting until the second arc is extinguished after being of the dead time by the circuit breaker trip.

The reclosing time means the total time from the point that the fault is occurred to that both circuit breakers are closed by reclosing.

Dead Time

The dead time means the interval from the dead time after the circuit breaker trip to the time that the ionized air is de-ionized; the insulation of the air is recovered; and the circuit breaker contacts is remaking to transmit electric power. Generally, to reduce the dead time and to speed up the remaking time are advantageous in improving the stability and safety of the system. However, in the event that the remaking time is too fast, it is required to check whether the arc extinction is complete since the arc may be re-ignited when the voltage is applied. The minimum dead time as experimentally required is calculated in the following formula 1.

$$t = 10.5 + \frac{kV}{34.5} \text{ [cycles]}$$

Second Arc

Faults in the power transmission system are classified by two types, a first arc and a second arc. After the fault is occurred in the system, the fault before being removed by the circuit breaker is called the 'first arc'. Before the fault is removed by the circuit breaker trip, the fault waveform is indicated as a very big fault current. Although the first arc is removed when the relay detects and the circuit breaker is tripped, a continuous arc constantly flows through the fault point by the capacitive coupling between the fault phase and the normal phase. This is called as the 'second arc'. As the second arc is generated at a high temperature in the gas ionized by the first arc, the second arc is not continuously transferred for a long time. Thus, the second arc is finally and naturally extinguished depending on the second arc current, the re-igniting voltage and the length of the arc.

Figure 1:
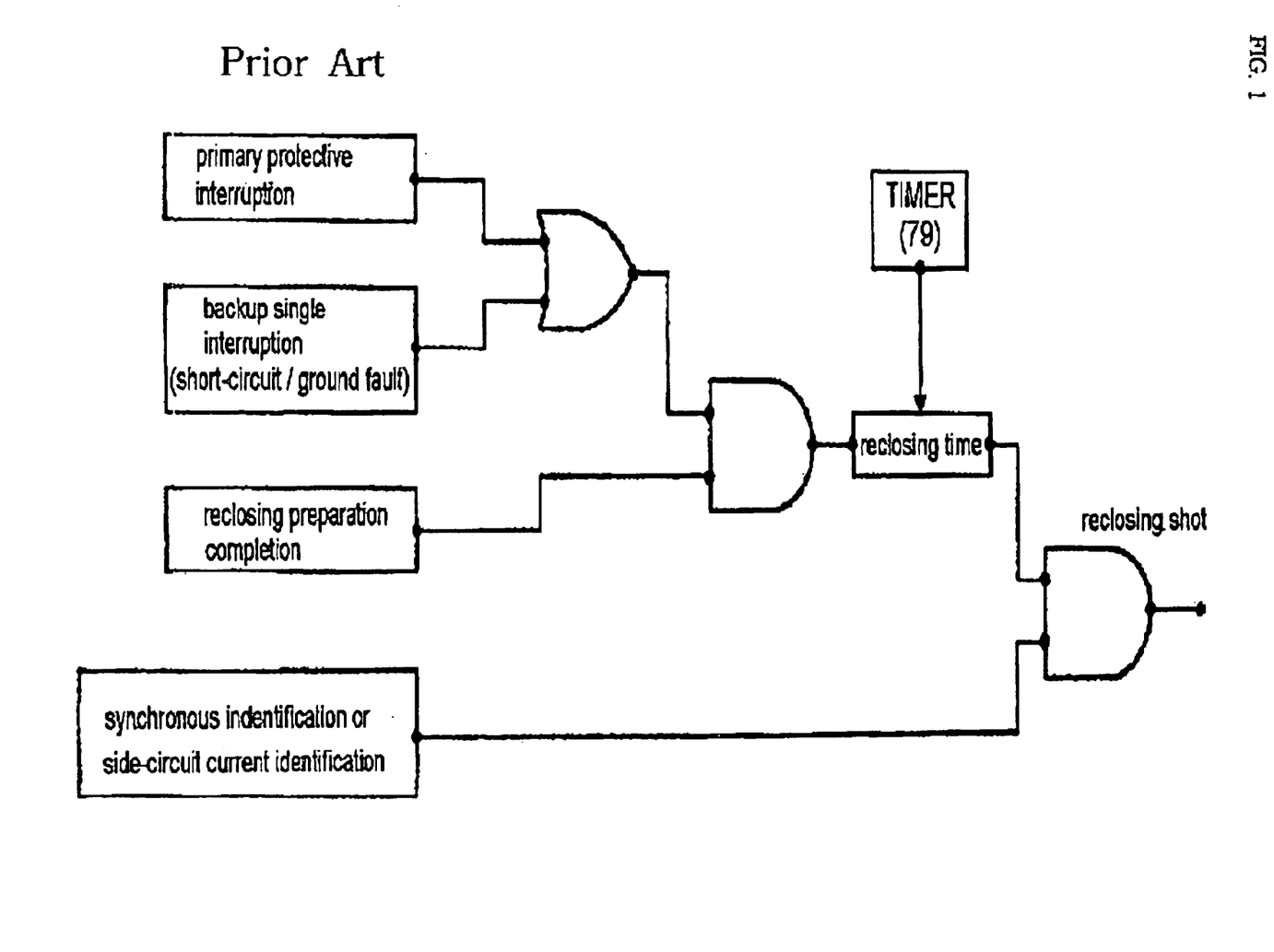
FIG. 1 is a reclosing circuit of a 345 kV Korean power transmission line according to the related art.

FIG. 1 is a reclosing circuit of the Korean 345 kV power transmission line according to the related art.

As illustrated in FIG. 1, since it needs to wait until the arc at the fault point is de-ionized and the insulation is recovered before the reclosing is shot, the shot of the reclosing is delayed as much as the reclosing time. Here, the reclosing is delayed as much as the dead time determined by the timer circuit, and in the 345 kV power transmission line, a single-phase reclosing being 48 cycle and a triple-phases reclosing being 24 cycles are usually fixed.

Figure 2:
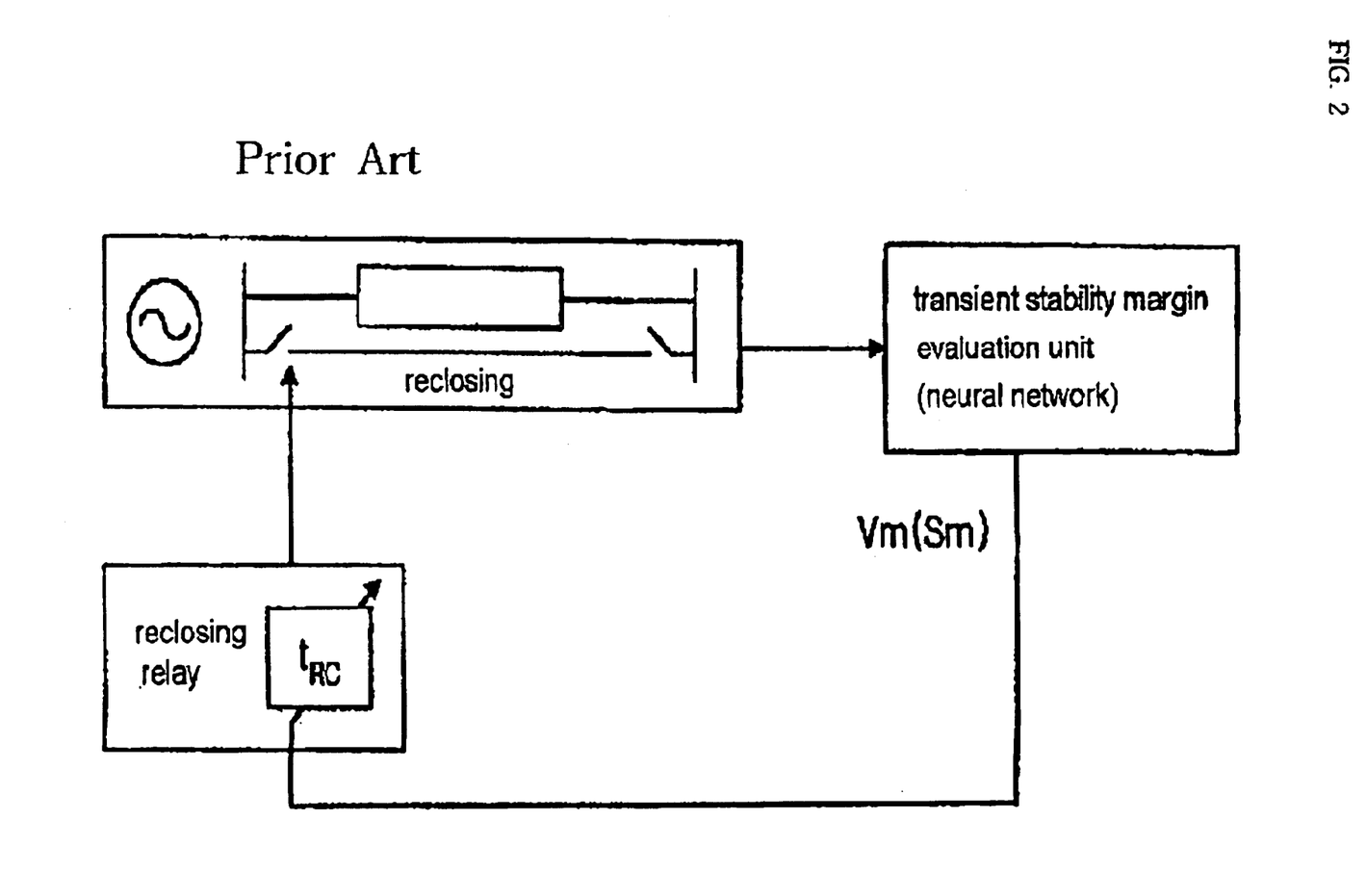
FIG. 2 is a reclosing device of a variable dead time as a result of evaluating a transient safety in the related art.

FIG. 2 is a reclosing device of a variable dead time as a result of evaluating a transient safety in the related art. As illustrated in FIG. 2, the device receives the information of the power transmission system when the fault occurs, evaluates using the Artificial Neural Network (ANN), and controls the dead time depending on the results. However, the existing arts have a drawback that the breaking duty (fixed dead time) of the existing reclosing scheme is not adaptive or it includes a possibility of error in operation due to delay in eliminating the second arc generated when the fault occurs as the transmission voltage of 765 kv is elevated to cope with the increased demand for electric power.

Further, since the fixed breaking duty in the existing arts is usually operated depending on the fixed dead time, even if the reclosing can be operated with high speed, the reclosing is delayed and the problem of decreasing the reliability on supply is caused.

It is difficult to realize the reclosing technique using the ANN by hardware; it is necessary to further study a way to reduce the learning error of the ANN; and the reclosing technique can be applied, in parts, for a low speed reclosing only because of the evaluation speed problem.

SUMMARY OF THE INVENTION

In order to solve the problems of the related arts as indicated above, it is, therefore, an object of the present invention to provide an adaptive reclosing method using a variable dead time control in a power transmission line, in which if a fault occurs due to a sharp increase of the transmission capacity in the 765 kV electric power supply system, it is extended to another faults of cutting a route of the power transmission line, and therefore this fatally affects the maintenance of safety and stability of the system; and an adaptively reclosing technique is performed depending on dead time different each fault by controlling the variable dead time after analyzing the voltage waveform of the relaying point and determining whether the second arc is extinguished and as the result, variably determining the dead time, even if not determining the dead time as a fixed time to prevent the loss in the power transmission system due to the inadaptable reclosing by fixing and setting dead time which is different every fault.

To achieve the above object, there is provided an adaptive reclosing method using a variable dead time control in a power transmission line of a power transmission system including a power transmission line (T/L) and a circuit breaker, the method comprising the steps of: An adaptive reclosing method using a variable dead time control in a power transmission line of a power transmission system including a power transmission line (T/L) and a circuit breaker, the method comprising the steps of: digitalizing by transmitting a voltage waveform of a faulted phase after the circuit breaker trip of the relaying point to 16 bits A/D converter through a potential transformer or a current & voltage transformer in the power transmission line (T/L) in order to provide the power by promptly reclosing an electric power transmission line if a fault occurs in the power transmission line (T/L); eliminating noise by passing the digitalized signals through a low-pass filter; determining the dead time as being variable by analyzing the voltage waveform of the relaying point through applying digital signals eliminating noise to a variable dead time control algorithm provided in a timer and checking whether a second arc at the fault point is extinguished; variably controlling a reclosing relay in correspondence to the dead time; and automatically recovering the power transmission line network by transmitting the control result of the reclosing relay to the circuit breaker of the power transmission system and re-transmitting the electric power by adaptively shutting a real reclosing.

In the present invention, the voltage waveform stored passing through a 16 bit A/D converter through a potential transformer (PT) or a current & voltage transformer (CVT) of the power transmission line (T/L) is passed through a low-pass filter (butterworth secondary filter) designed for anti-aliasing and to remove harmonic wave components.

Analyzing the voltage waveform of the relaying point which is low-pass filtered and tracking and monitoring a effective value of the voltage waveform at real-time, if a time (point of time) for the second arc extinction is determined, a variable dead time is determined. In line with the determined variable dead time result, the dead time of the reclosing device is controlled as variable so that another reclosing shot time (adaptive reclosing method) is determined and thus the reclosing is phased in according to various faults.

Since the 765 kV power transmission line is in process of construction, an algorithm inspection is done using the data obtained in the 765 kV real system modeling through the Electromagnetic Transient Program (EMTP), and the variable dead time control technique (algorithm) uses the language such as "MODELS in the EMTP compiled in Fortran" to make it easier to embody in hardware.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will now be described with reference to the accompanying drawings. In the following description, same drawing reference numerals are used for the same elements even in different drawings. The matters defined in the description such as a detailed construction and elements of a circuit are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 4:
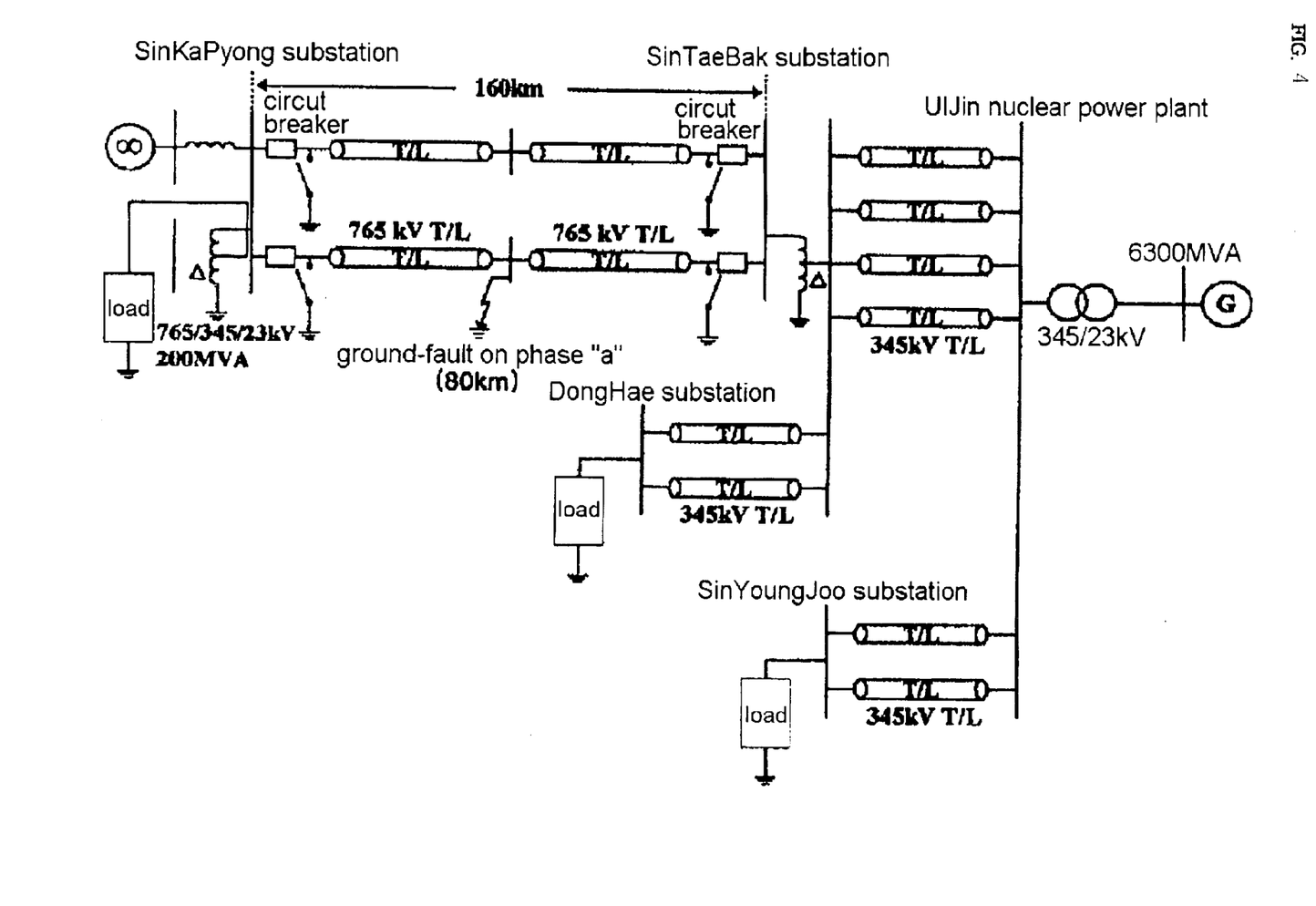
FIG. 4 is a system diagram illustrating a 765 kV model applying an adaptive reclosing art using a variable dead time control in the power transmission line according to an embodiment of the present invention.

FIG. 4 is a system diagram illustrating a 765 kV model applying an adaptive reclosing technique using a variable dead time control in the power transmission line according to an embodiment of the present invention.

The system illustrated in FIG. 4 is in process of construction at present, taking and SinTaeBak; the load being expected to the maximum load until 2006; the fault current is 50 [kA] in the maximum size. Herein, UlJin power plant and 345 kV system are added to increase the reliability of the model system. It is arranged that the fault such as a ground-fault be occurred at point "a" in Circuit 1 at 80[km], which is a middle position of the 765 kV power transmission line being 160[km].

Figure 5:
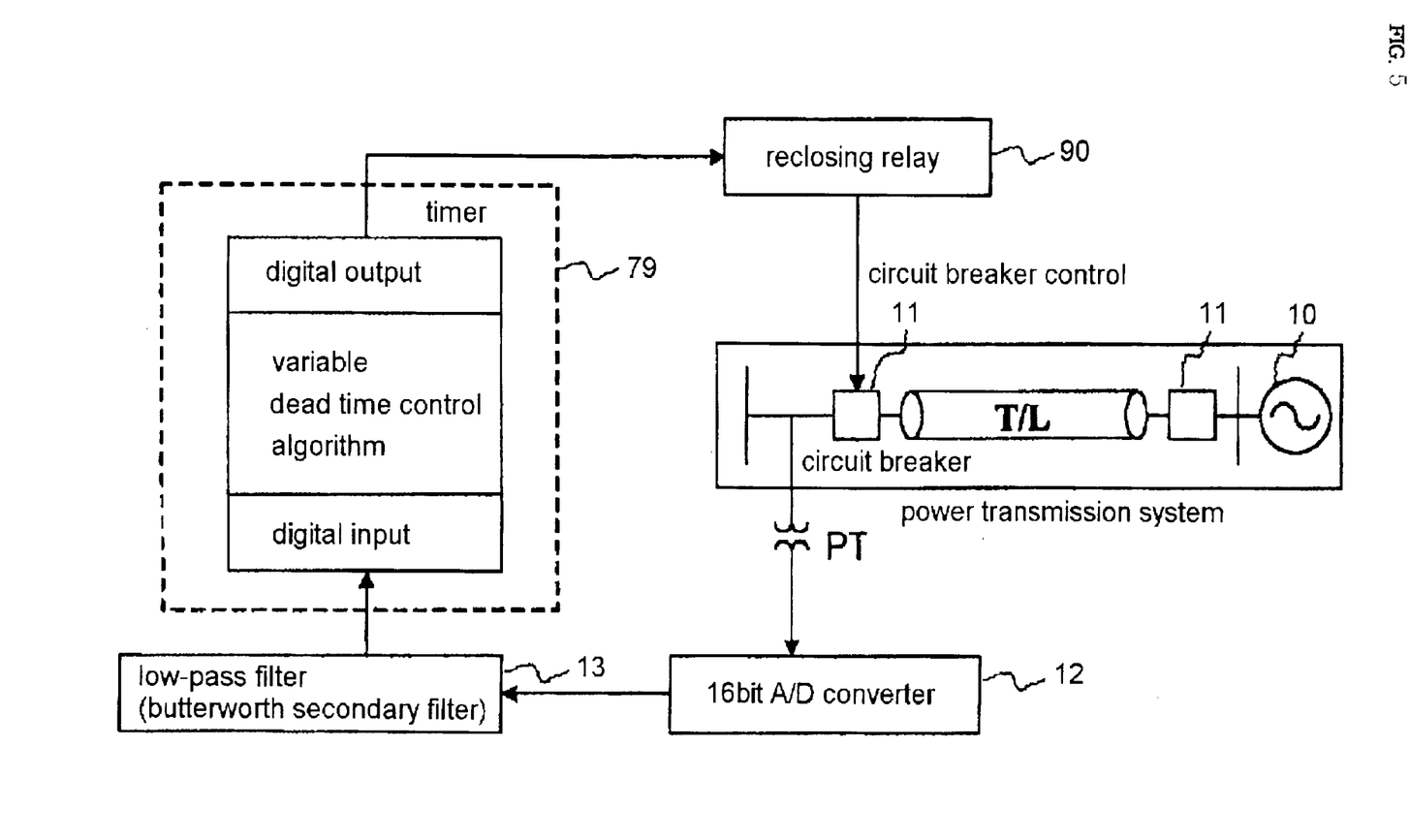
FIG. 5 is a whole flow chart illustrating the adaptive reclosing method using the variable dead time control in the power transmission line according to the present invention.

FIG. 5 is a whole flow chart illustrating the adaptive reclosing method using the variable dead time control in the power transmission line according to the present invention.

As illustrated in FIG. 5, in the present invention, the voltage waveform of a faulted phase after the circuit breaker trip of the relaying point is digitalized by transmitting the voltage waveform to 16 bits A/D converter 12 through a potential transformer or a current & voltage transformer in the power transmission line (T/L) in order to provide the power by promptly reclosing an electric power transmission line if a fault occurs in the power transmission line (T/L) (Step 1). The digitalized signals are passed through a low-pass filter 13 to eliminate noise (Step 2). And, the dead time is determined as being variable by analyzing the voltage waveform of the relaying point through applying digital signals eliminating noise to a variable dead time control algorithm provided in a timer 79 and checking whether a second arc at the fault point is extinguished. Continuously, a reclosing relay 90 is variably controlled in correspondence to the dead time, and thus the power transmission line network is automatically recovered by transmitting the control result of the reclosing relay 90 to the circuit breaker 11 of the power transmission system and re-transmitting the electric power by adaptively shutting a real reclosing.

Figure 6:
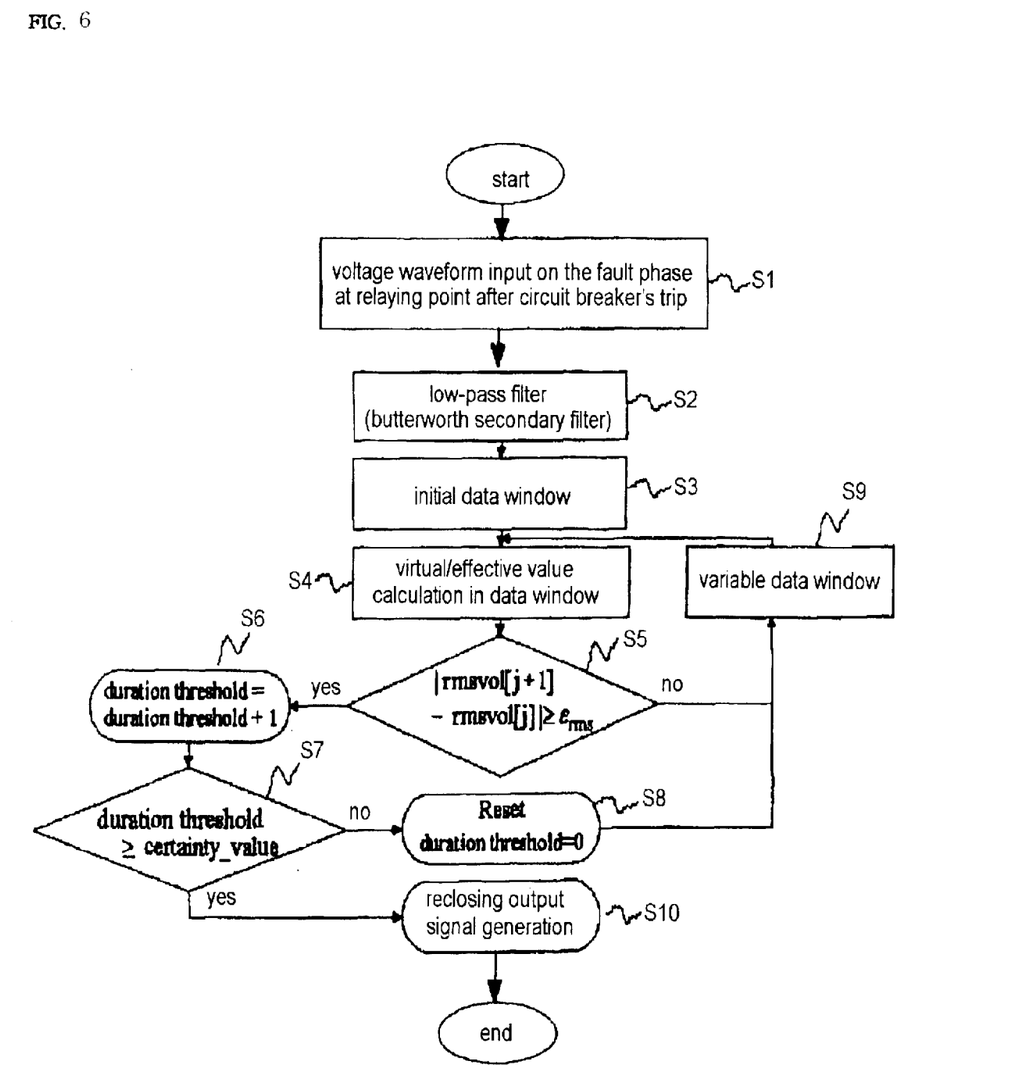
FIG. 6 is a flow chart illustrating the variable dead time control algorithm as a core of the present invention.

FIG. 6 is a flow chart illustrating the variable dead time control algorithm as a core of the present invention.

The obtained voltage waveform of the relaying point is digitally input in the variable dead time control algorithm as embodied using the language such as "MODELS in the Electromagnetic Transient Program (EMTP) compiled in Fortran" in the hardware of the timer 79 and the voltage waveform of the relaying point is analyzed from the initial data window (64 Sample/Cycle) (Step 3). The effective value thereof is calculated in the data window (Step 4).

If the differential value, which is a difference between the current effective value and the effective value in the preceding step of the voltage waveform of the relaying point which is low-pass filtered in one data window, is bigger or equal than the fixed value ($\epsilon_{rms}$) (Step 5), the duration threshold is increased (duration threshold=duration threshold+1) (Step 6).

If the difference value is smaller than the fixed value ($\epsilon_{rms}$) (Step 5), a variable data window is controlled (Step 9), thereby repeating the process of calculating the effective value of the next data window (Step 4).

If the duration threshold is increased and reaches to a certainty value (duration threshold≧certainty_value) (Step 7), whether or not the second arc extinction is determined and the signals for operating the reclosing relay 90 are output (Step 10).

If the duration threshold is increased but is smaller than the certainty value, the duration threshold (duration threshold=0) is reset (Step 8) and then the variable data window is controlled (Step 9), thereby repeating the process of calculating the effective value of the next data window (Step 5).

Figure 7:
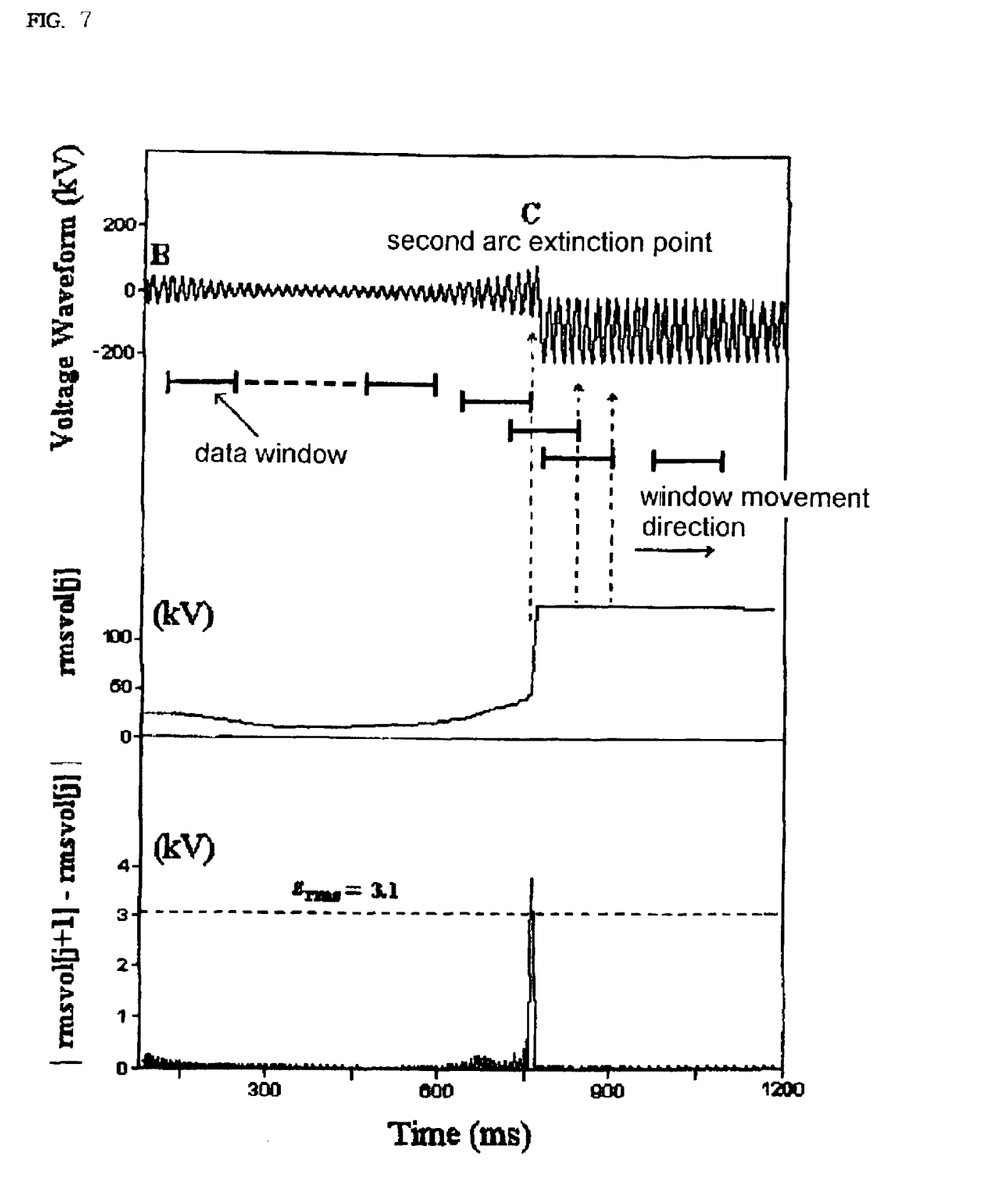
FIG. 7 is output waveforms being applied by the variable dead time control algorithm of FIG. 6.

FIG. 7 is output waveforms being applied by the variable dead time control algorithm of FIG. 6.

Upon reviewing the resulted waveform as shown FIG. 7, the effective value (rmsvol) of the voltage waveform at the relaying point, which is low-pass filtered, is suddenly increased at Point c by the recovering waveform from the fault point. Therefore, at the point that the second arc is extinguished, the difference (rmsvol[j+1]−rmsvol[j]) of the effective value is over the fixed value ($\epsilon_{rms}$) of the difference value and the dead time is determined. All these processes are embodied in a moving window method, each moving window is sampled as 3840 [Hz], that is, 64 [Sample/cycle], and the data window is continuously moved by one sample.

TABLE 1

| Variable Dead Time Control Algorithm | Real Time of 2nd Arc Extinction (sec) | Estimated Result of Algorithm (sec) | Time of shot Reclosing (sec) | Error (%) |
|---|---|---|---|---|
| SinTabBak Fault (0 km) | 0.343 | 0.343 | 0.577 | 0.66 |
| Middle Point Fault (80 km) | 0.359 | 0.359 | 0.592 | 0.03 |
| SinKaPyong Fault (160 km) | 0.400 | 0.401 | 0.634 | 0.145 |

Estimation of the time for the second arc extinction and the reclosing shot, using the variable dead time control algorithm If an algorithm is applied to three kinds of faults (in SinTaeBak, in the middle position, and SinKaPyong) according to the fault points in Table 1,it indicates the result almost identical with the real resultant value. Therefore, it is possible to detect the time of extinction of the second arcs which are different from each other according to the kinds of faults, and by the result, it can be proved that the reclosing is adaptively shot by varying the dead time respectively.

Figure 8:
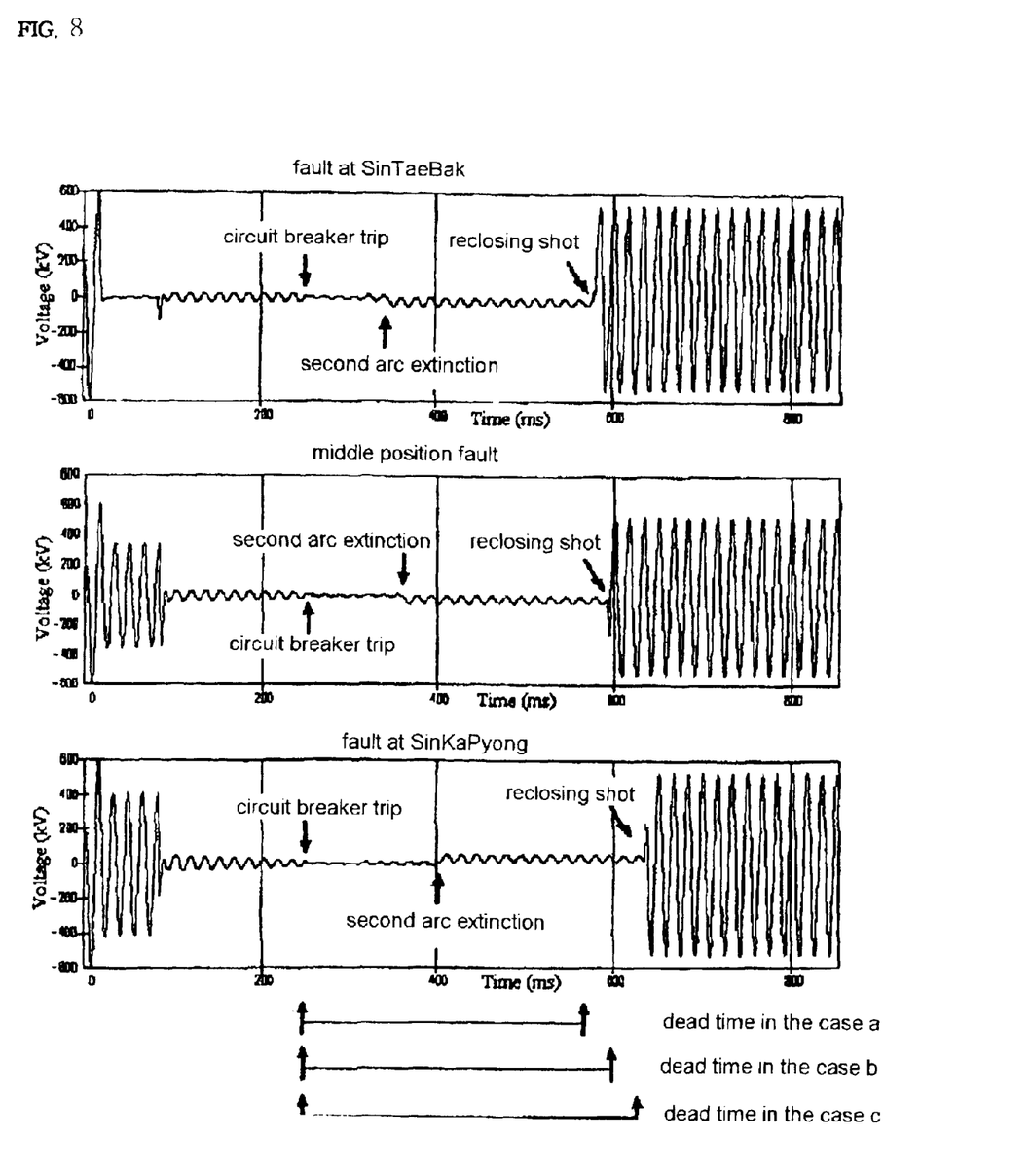
FIG. 8 is waveforms as the adaptive reclosing result according to the reclosing method using the variable dead time control.

FIG. 8 is the waveform as the adaptive reclosing result according to the reclosing method using the variable dead time control.

As shown in the waveform of FIG. 8, in the three kinds of faults having the different fault positions, it is noted that the periods of the dead time are different from one another by the variable dead time control algorithm, and the reclosing is also adaptively shot at different time in each fault. Accordingly, when the faults occur in the power transmission line, the circuit breaker is operated by means of the protective relay so that the faults are removed, and after the dead time, the circuit breaker is reclosed so that the power transmission line network is promptly and automatically recovered and thus the reliability of supply of the power transmission system is maintained.

As described in detail, in the present invention relating to the adaptive reclosing method using the variable dead time control, when the fault occurs in the power transmission line, the circuit breaker is operated by the protective relay to remove the fault, and after the dead time, the circuit breaker is reclosed to automatically recover the prompt power transmission line network and to maintain the reliability of supply in the power transmission system, thereby providing a high speed reclosing method which is reliable and adaptable according to the elevation of the transmission voltage. Further, since the variable dead time not the specifically fixed operation-duty is used, the adaptive operation-duty of an operator is possible according to the kinds of faults, thereby providing the effect of more increasing the reliability of supply of the power transmission system.

In particular, by applying the variable dead time control algorithm which is easy to be embodied in hardware, the acting-effects are expected to be great in view of the additional loading of the existing reclosing relay and the utility value.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An adaptive reclosing method, which uses a variable dead time control in a power transmission system including a power transmission line (T/L), and a circuit breaker, the method comprising:

A/D converting a voltage waveform of a faulted phase after the circuit breaker trip of a relaying point, to obtain a first digitized signal;

eliminating noise by passing the first digitalized signal through a low-pass filter to obtain a second digitized signal;

determining the variable dead time by submitting the second digitized signal to a variable dead time control algorithm and checking whether a second arc at a fault point is extinguished;

variably controlling a reclosing relay in correspondence to the dead time; and exercising an adaptively controlled reclosing;

the variable dead time control algorithm comprising:

calculating an effective value of the second digitized signal in periodically occurring data windows;

increasing a duration threshold if a differential value between the calculated effective values of the second digitized signal is not less than a fixed value;

repeating the process of calculating the effective value in consecutive data windows and controlling a variable data window if the differential value is less than the fixed value;

outputting signals for operating a reclosing relay if the increased duration threshold is not less than a certainty value; and controlling the variable data window after resetting the duration threshold if the duration threshold is less than the certainty value, and repeating the process of calculating the effective value in subsequent data windows.

2. The method of claim 1, in which the low-pass filter is a second order butterworth filter.

3. An adaptive reclosing method using a variable dead time control algorithm in a power transmission line of a power transmission system, the variable dead time control algorithm comprising:

(a) calculating an effective value in a (n) data window of which one cycle includes (n) sample to (n+63) sample by analyzing a digitalized input voltage waveform of a relaying point (n=1,2,3,4,5, . . . );

(b) calculating an effective value in a (n+1) data window of which one cycle includes (n+1) sample to (n+64) sample by one sample shift of the (n) data window;

(c) increasing a duration threshold if a differential value between the effective value of the (n) data window and the effective value of the (n+1) data window is not less than a fixed value;

(d) repeating the steps (a), (b) and (c) by increasing the value of (n) by 1(one) if the differential value is less than the fixed value;

(e) outputting signals for operating a reclosing relay by recognizing as a second arc extinction if the increased duration threshold is not less than a certainty value; and (f) repeating the steps (a), (b) and (c) by increasing the value of (n) by 1(one) after resetting the duration threshold if the duration threshold is less than the certainty value.

* * * * *